United States Patent
Yoshikawa et al.

(10) Patent No.: US 10,036,097 B2
(45) Date of Patent: *Jul. 31, 2018

(54) CONDUCTIVE COATING FILM FORMING BATH

(71) Applicant: OKUNO CHEMICAL INDUSTRIES CO., LTD., Osaka-shi, Osaka (JP)

(72) Inventors: Junji Yoshikawa, Osaka (JP); Yukiya Takeuchi, Osaka (JP); Koji Kita, Osaka (JP)

(73) Assignee: OKUNO CHEMICAL INDUSTRIES CO., LTD., Osaka-shi (JP)

( * ) Notice: Subject to any disclaimer, the term of this patent is extended or adjusted under 35 U.S.C. 154(b) by 248 days.

This patent is subject to a terminal disclaimer.

(21) Appl. No.: 14/652,199

(22) PCT Filed: Dec. 17, 2013

(86) PCT No.: PCT/JP2013/083713
§ 371 (c)(1),
(2) Date: Jun. 15, 2015

(87) PCT Pub. No.: WO2014/098064
PCT Pub. Date: Jun. 26, 2014

(65) Prior Publication Data
US 2015/0322585 A1    Nov. 12, 2015

(30) Foreign Application Priority Data
Dec. 21, 2012 (JP) .................. 2012-279199

(51) Int. Cl.
*C23C 18/40* (2006.01)
*C23C 18/16* (2006.01)
(Continued)

(52) U.S. Cl.
CPC ................. *C25D 5/54* (2013.01); *B05D 1/18* (2013.01); *C09D 5/24* (2013.01); *C23C 18/40* (2013.01);
(Continued)

(58) Field of Classification Search
CPC . C23C 18/40; C23C 18/1653; C23C 18/2086; C23C 18/24; C23C 18/285;
(Continued)

(56) References Cited

U.S. PATENT DOCUMENTS 3,930,963 A     1/1976  Polichette et al.
4,632,852 A  *  12/1986 Akahoshi ................ C23C 18/40
                                                          106/1.23
(Continued)

FOREIGN PATENT DOCUMENTS

CN   1745194 A1   3/2006
EP   0 616 053 A1  9/1994
(Continued)

OTHER PUBLICATIONS

English translation of the Written Opinion of the International Search Authority dated Mar. 4, 2014 for PCT/JP2013/083713; 4 pages.*
(Continued)

*Primary Examiner* — Helene Klemanski
(74) *Attorney, Agent, or Firm* — Westerman, Hattori, Daniels & Adrian, LLP

(57) ABSTRACT

This invention relates to a conductive-coating bath comprising an aqueous solution containing (A) a copper compound, (B) a complexing agent, (C) an alkali metal hydroxide, (D) a $C_{2-5}$ aliphatic polyalcohol compound, and (E) at least one compound selected from the group consisting of reducing compounds having a —COOM group, wherein M is hydrogen, an alkali metal, or a —$NH_4$ group, and reducing
(Continued)

saccharides having six or more carbon atoms. The present invention provides a composition for forming a conductive coating having excellent properties as a base layer for electroplating, which is effectively used to form a uniform decorative coating having excellent appearance by electroplating on a non-conductive plastic molding.

10 Claims, 2 Drawing Sheets

(51) Int. Cl.

| | | |
|---|---|---|
| *C23C 18/20* | (2006.01) |
| *C23C 18/24* | (2006.01) |
| *C23C 18/28* | (2006.01) |
| *C23C 18/30* | (2006.01) |
| *C25D 5/14* | (2006.01) |
| *C25D 5/34* | (2006.01) |
| *C25D 5/54* | (2006.01) |
| *C25D 3/38* | (2006.01) |
| *B05D 1/18* | (2006.01) |
| *C09D 5/24* | (2006.01) |

(52) U.S. Cl.
CPC ............ *C25D 5/34* (2013.01); *C23C 18/1653* (2013.01); *C23C 18/2086* (2013.01); *C23C 18/24* (2013.01); *C23C 18/285* (2013.01); *C23C 18/30* (2013.01); *C25D 3/38* (2013.01)

(58) Field of Classification Search
CPC .. C23C 18/30; C25D 3/04; C25D 3/12; C25D 3/38; C25D 5/14; C25D 5/34; C25D 5/54; B05D 1/18
USPC ............. 106/1.23, 1.26; 252/519.3; 427/123; 205/169
See application file for complete search history.

(56) References Cited

U.S. PATENT DOCUMENTS

| | | | |
|---|---|---|---|
| 5,419,926 A | 5/1995 | Soltys | |
| 5,543,182 A | 8/1996 | Joshi et al. | |
| 5,645,628 A | 7/1997 | Endo et al. | |
| 5,795,828 A | 8/1998 | Endo et al. | |
| 6,331,239 B1 | 12/2001 | Shirota et al. | |
| 6,805,915 B2 | 10/2004 | Itabashi et al. | |
| 7,169,216 B2 | 1/2007 | Itabashi et al. | |
| 7,220,296 B1* | 5/2007 | Chowdhury ............ C23C 18/40 106/1.23 | |
| 9,657,226 B2* | 5/2017 | Nagamine ................ C23C 18/24 | |
| 2003/0054094 A1 | 3/2003 | Itabashi et al. | |
| 2005/0079280 A1 | 4/2005 | Itabashi et al. | |
| 2006/0134318 A1 | 6/2006 | Hudd et al. | |
| 2007/0079727 A1 | 4/2007 | Itabashi et al. | |
| 2008/0223253 A1* | 9/2008 | Song ........................ C23C 18/40 106/1.23 |
| 2009/0120798 A1 | 5/2009 | Tai | |
| 2010/0003399 A1 | 1/2010 | Hotta et al. | |
| 2010/0155255 A1* | 6/2010 | Nagao ................. C23C 18/1653 205/184 |
| 2010/0247880 A1 | 9/2010 | Kano et al. | |
| 2012/0058254 A1 | 3/2012 | Hotta et al. | |
| 2016/0273118 A1* | 9/2016 | Takeuchi ................. C25D 3/04 |

FOREIGN PATENT DOCUMENTS

| | | |
|---|---|---|
| EP | 0 913 502 A1 | 5/1999 |
| EP | 0 815 292 B1 | 1/2000 |
| GB | 1195217 A | 6/1970 |
| GB | 2 109 013 A | 5/1983 |
| JP | 61-9578 A | 1/1986 |
| JP | 03-076599 B2 | 12/1991 |
| JP | 05-148662 A | 6/1993 |
| JP | 05-221637 A | 8/1993 |
| JP | 08-83796 A | 3/1996 |
| JP | 09-509219 A | 9/1997 |
| JP | 2000-144439 A | 5/2000 |
| JP | 3091583 B2 | 9/2000 |
| JP | 2003-138381 A | 5/2003 |
| JP | 2005-200666 A | 7/2005 |
| JP | 2006-219757 A | 8/2006 |
| JP | 2006-299366 A | 11/2006 |
| JP | 4351736 B2 | 10/2009 |
| JP | 2010-031361 A | 2/2010 |
| JP | 2010-254971 A | 11/2010 |
| KR | 20020069154 A | 8/2002 |
| WO | 98/045505 A1 | 10/1998 |

OTHER PUBLICATIONS

English translation of JP 2000/144439, May 2000; 18 pages.*
English translation of JP 2003/138381, May 2003; 31 pages.*
English translation of JP 2005/200666, Jul. 2005; 9 pages.*
Supplementary Partial European Search Report (ESR) dated Aug. 3, 2016, issued in counterpart European Patent Application No. 13866055.0. (9 pages).
Office Action dated Jun. 21, 2017, issued in counterpart Korean Patent Application No. 10-2016-7013814, with English machine translation. (11 pages).
Written Opinion dated Jan. 13, 2015, issued in counterpart International Application No. PCT/JP2014/080527; cited in U.S. Non-Final Office Action dated Jun. 22, 2017 (4 pages).
Non-Final Office Action dated Jun. 22, 2017, issued in U.S. Appl. No. 15/034,424. (23 pages).
Extended (supplementary) European Search Report dated May 31, 2017, issued in counterpart European Application No. 14879928.1. (6 pages).
Final Office Action dated Nov. 2, 2017, issued in U.S. Appl. No. 15/034,424. (18 pages).
Notice of Allowance dated Feb. 9, 2018, issued in U.S. Appl. No. 15/034,424 (9 pages).

* cited by examiner

CONDUCTIVE COATING FILM FORMING BATH

TECHNICAL FIELD

The present invention relates to a conductive-coating bath, a method of forming the conductive coating, and a method of electroplating non-conductive plastic moldings.

BACKGROUND ART

Among methods of electroplating non-conductive plastic moldings to form a decorative coating, a widely used method comprises, in succession, degreasing, etching, optionally neutralizing and pre-dipping, then applying a catalyst for electroless copper plating by using a colloidal solution containing a tin compound and a palladium compound, and optionally activating (performing accelerator treatment), followed by electroless copper plating and electroplating.

A frequently used electroless copper plating solution in such a plating method contains a reducing agent that has high reducing power, such as paraformaldehyde. When this type of electroless copper plating solution is used, copper is deposited in the initial plating stage on a highly catalytic palladium portion of a tin-palladium colloidal coating attached as the catalyst. Then, the copper deposition continues due to the reducing action of the reducing agent with high reducing power, and a copper layer is formed not only on the palladium portion but also in the transverse direction. As a result, copper is also deposited to form a layer on an inherently non-catalytic tin portion so that a bridge deposit is formed, and a spongy coating is likely to be formed.

When electroplating is conducted on the electrolessly plated surface having the bridge deposit, pit-like fine agglomerates (called "stardust") partially deposit in a large number, thereby tending to render the plated layer uneven. This layer often shows an inferior appearance compared with a plated layer formed on a metallic substrate.

To prevent the creation of such inferior appearance, a method of forming a decorative coating of excellent appearance is known, the method comprising applying a catalyst for electroless plating to a plastic molding, forming a coating having excellent conductivity with no bridge deposits by using an electroless copper plating solution containing a saccharide having relatively weak reducing power as a reducing agent, and performing electroplating directly on the resulting coating (Patent Literature (PTL) 1).

However, even if this conductive-coating bath is used, it is difficult to uniformly electroplate a large non-conductive plastic molding, and thus, there is a high demand for a more excellent conductive-coating bath.

CITATION LIST

Patent Literature

PTL 1: WO 98/045505

SUMMARY OF INVENTION

Technical Problem

The present invention has been accomplished in view of the problems of the conventional techniques described above. A main object of the present invention is to provide a composition for forming a conductive coating having excellent properties as a base layer for electroplating, which is effectively used to form a uniform decorative coating having excellent appearance by electroplating on a non-conductive plastic molding.

Solution to Problem

The present inventor conducted extensive research to achieve the above object and found that when an aqueous solution obtained by adding a specific compound as a reducing agent to an alkaline aqueous solution containing a copper compound, a complexing agent, and a specific aliphatic polyalcohol is used, a simple method comprising immersing a non-conductive plastic molding in this aqueous solution can form a uniform coating with no bridge deposits on the surface of the non-conductive plastic molding. The thus formed coating contains copper oxide as a main component and has excellent conductivity, as well as high acid resistance; therefore, even when this coating is immersed in a strongly acidic plating solution, such as a copper sulfate plating solution, no damage is caused on the coating, and a uniform decorative coating having excellent appearance is formed.

The present invention has been made through further research based on the above findings.

Specifically, the present invention provides the following conductive-coating bath, method of forming a conductive coating, and method of electroplating a non-conductive plastic molding.

1. A conductive-coating bath comprising an aqueous solution containing:
   (A) a copper compound;
   (B) a complexing agent;
   (C) an alkali metal hydroxide;
   (D) a $C_{2-5}$ aliphatic polyalcohol compound; and
   (E) at least one compound selected from the group consisting of reducing compounds having a —COOM group, wherein M is hydrogen, an alkali metal, or a —$NH_4$ group, and reducing saccharides having six or more carbon atoms.

2. The conductive-coating bath according to Item 1, wherein the bath comprises as component (E) both a reducing compound having a —COOM group, wherein M is hydrogen, an alkali metal, or a —$NH_4$ group, and a reducing saccharide having six or more carbon atoms.

3. A method of forming a conductive coating on a non-conductive plastic molding, the method comprising bringing the conductive-coating bath of Item 1 or 2 into contact with a non-conductive plastic molding to which a catalyst substance is applied.

4. The method of forming a conductive coating according to Item 3, wherein the conductive-coating bath is in a state in which the amount of dissolved oxygen is increased when brought into contact with the non-conductive plastic molding.

5. The method of forming a conductive coating according to Item 4, wherein the amount of the dissolved oxygen is increased by supplying oxygen-containing gas bubbles or by adding an oxidizing agent to the bath.

6. A method of electroplating a non-conductive plastic molding, the method comprising the steps of:
   forming a conductive coating using the conductive-coating bath according to the method of any one of Items 3 to 5; and
   performing electroplating.

The following describes in detail the conductive-coating bath of the present invention.

The conductive-coating bath of the present invention comprises an aqueous solution containing the following components (A) to (E):

(A) a copper compound;
(B) a complexing agent;
(C) an alkali metal hydroxide;
(D) a $C_{2-5}$ aliphatic polyalcohol compound; and
(E) at least one compound selected from the group consisting of reducing compounds having a —COOM group, wherein M is hydrogen, an alkali metal, or a —NH$_4$ group, and reducing saccharides having six or more carbon atoms.

The "reducing compound having a —COOM group, wherein M is hydrogen, an alkali metal, or a —NH$_4$ group" may be sometimes referred to as a "carboxy-containing reducing compound."

The following describes in detail the components contained in the conductive-coating bath of the present invention.

(1) Conductive-Coating Bath
(A) Copper Compound

It is essential for the conductive-coating bath of the present invention to contain a copper compound. The copper compound used is not limited as long as it is water-soluble, and, for example, copper sulfate, copper chloride, copper carbonate, copper hydroxide, and the like may be used.

The amount of the copper compound used is preferably about 0.1 to 5 g/L, and more preferably about 0.8 to 1.2 g/L, calculated as copper metal.

If the amount of the copper metal is too small, a conductive coating is insufficiently formed, and deposition occurs unsatisfactorily in the subsequent electroplating step; therefore, an excessively small amount of the copper metal is not preferable.

On the other hand, if the amount of the copper metal is too large, almost no effect is produced by the increase in the copper concentration, although an increase in the amount of the complexing agent is required in proportion to the copper concentration, resulting in economic disadvantage and in difficulty in effluent treatment.

(B) Complexing Agent

It is essential for the conductive-coating bath of the present invention to contain a complexing agent. The complexing agent used may be one known as efficient for copper ions. For example, hydantoin compounds and organic carboxylic acids may be used.

Examples of hydantoin compounds include hydantoin, 1-methylhydantoin, 1,3-dimethylhydantoin, 5,5-dimethylhydantoin, allantoin, and the like. Examples of organic carboxylic acids include citric acid, tartaric acid, succinic acid, salts thereof, and the like.

These complexing agents may be used singly or in a combination of two or more.

The amount of the complexing agent used is preferably about 2 to 50 g/L, and more preferably about 10 to 40 g/L.

An excessively small amount of the complexing agent achieves insufficient complexing power, resulting in lack of ability to dissolve copper; thus, an excessively small amount of the complexing agent is not preferable.

Although an excessively large amount of the complexing agent enhances the ability to dissolve copper, it leads to economic disadvantage and difficulty in effluent treatment, and is thus not preferable.

(C) Alkali Metal Hydroxide

It is essential for the conductive-coating bath of the present invention to contain an alkali metal hydroxide. As the alkali metal hydroxide used, it is suitable to use sodium hydroxide, potassium hydroxide, lithium hydroxide, and the like, in view of their easy availability, costs, and the like.

These alkali metal hydroxides may be used singly or in a combination of two or more.

The amount of the alkali metal hydroxide used is preferably about 10 to 80 g/L, and more preferably about 30 to 70 g/L.

If the amount of the alkali metal hydroxide is too small, a conductive coating is insufficiently formed, and deposition occurs unsatisfactorily over the range of low current density in the subsequent electroplating step. Therefore, the use of an excessively small amount of alkali metal hydroxide is not preferable.

On the other hand, an excessively large amount of the alkali metal hydroxide is not preferable because the solubility of copper decreases as the hydroxide concentration increases, lowering the stability of the conductive-coating bath.

The conductive-coating bath preferably has a pH of 10.0 to 14.0, and more preferably 11.5 to 13.5 within the proportional range of the components mentioned above. The combination of the components used and the specific proportions of the components may be suitably adjusted.

In the present invention, it is essential to use the following components (D) and (E), in addition to the copper compound, complexing agent, and alkali metal hydroxide described above.

(D) Aliphatic Polyalcohol

It is essential for the conductive-coating bath of the present invention to contain a $C_{2-5}$ aliphatic polyalcohol. The $C_{2-5}$ aliphatic polyalcohol used is not limited as long as it is a $C_{2-5}$ straight or branched chain aliphatic polyalcohol having two or more hydroxy groups. The carbon chain in the aliphatic polyalcohol may contain one or more oxygen atoms.

The number of hydroxy groups contained in the $C_{7-5}$ aliphatic polyalcohol is not limited as long as it is two or more, preferably two to four, more preferably two or three, and particularly preferably two.

Specific examples of the $C_{2-5}$ aliphatic polyalcohol include ethylene glycol, 1,2-propanediol, 1,2-butanediol, 1,2-pentanediol, glycerin, erythritol, xylitol, 1,2,4-butanetriol, diethylene glycol, 1,3-propanediol, 1,4-butanediol, 1,5-pentanediol, 2,2-dimethyl-1,3-propanediol, and the like.

These aliphatic polyalcohol compounds may be used singly or in a combination of two or more.

The amount of the aliphatic polyalcohol compound used is preferably about 1 to 500 g/L, and more preferably about 1 to 200 g/L.

If the amount of the aliphatic polyalcohol compound is too small, a conductive coating is insufficiently formed, and deposition occurs unsatisfactorily over the range of low current density in the subsequent electroplating step. Therefore, the use of an excessively small amount of aliphatic polyalcohol compound is not preferable.

On the other hand, an excessively large amount of the aliphatic polyalcohol compound leads to economic disadvantage and difficulty in effluent treatment, and is not preferable.

As the $C_{2-5}$ aliphatic polyalcohol contained in the conductive-coating bath of the present invention, it is preferable to use, in particular, an aliphatic polyalcohol having two or less carbon atoms between two hydroxy groups.

For example, it is preferable to use ethylene glycol, 1,2-propanediol, glycerin, erythritol, or xylitol, and it is particularly preferable to use ethylene glycol.

The amount of an aliphatic polyalcohol having two or less carbon atoms between two hydroxy groups, when used, is about 1 to 50 g/L, which makes it possible to form a coating having excellent conductivity.

The amount of an aliphatic polyalcohol having three or more carbon atoms between two hydroxy groups, when used, is preferably about 50 g/L or more within the above amount range.

Examples of aliphatic polyalcohols having three or more carbon atoms between two hydroxy groups include 1,2,4-butanetriol, diethylene glycol, 1,3-propanediol, 1,4-butanediol, 1,5-pentanediol, 2,2-dimethyl-1,3-propanediol, and the like.

(E) Reducing Agent

It is essential for the conductive-coating bath of the present invention to contain as a reducing agent at least one compound selected from the group consisting of carboxy-containing reducing compounds and reducing saccharides having six or more carbon atoms. The use of such a specific reducing agent makes it possible to form a uniform conductive coating free from bridge deposits.

Carboxy-Containing Reducing Compound

The carboxy-containing reducing compound contained in the conductive-coating bath of the present invention is not limited, and known compounds may be used as long as they have a —COOM group, wherein M is hydrogen, an alkali metal, or a —$NH_4$ group, and have reducing properties.

Examples of the carboxy-containing reducing compound used include carboxylic acids having reducing properties, dicarboxylic acids having reducing properties, salts thereof, and the like.

As the carboxylic acid having reducing properties, it is possible to use, for example, formic acid, glyoxylic acid, salts thereof, and the like. As the dicarboxylic acid having reducing properties, it is possible to use oxalic acid, maleic acids, salts thereof, and the like.

Examples of the salts include alkali metal salts, salts containing a —$NH_4$ group (ammonium salts), and the like. Examples of alkali metals include lithium, sodium, potassium, and the like.

These carboxy-containing reducing compounds may be used singly or in a combination of two or more.

Reducing Saccharides Having Six or More Carbon Atoms

The reducing saccharide having six or more carbon atoms contained in the conductive-coating bath of the present invention is not particularly limited, as long as it has six or more carbon atoms and reducing properties, and known reducing saccharides may be used, such as monosaccharides, disaccharides, oligosaccharides, polysaccharides, sugar alcohols, sugar acids, amino sugars, deoxy sugars, lactones, and the like.

The reducing saccharides having six or more carbon atoms preferably has six or more carbon atoms, and more preferably 6 to 12 carbon atoms.

Examples of reducing saccharides having six or more carbon atoms include monosaccharides, such as glucose, disaccharides, such as cane sugar, polysaccharides, such as cellulose, sugar alcohols, such as sorbitol and mannitol, sugar acids, such as ascorbic acid, lactones, such as glucono lactone, and the like.

These reducing saccharides having six or more carbon atoms may be used singly or in a combination of two or more.

The total amount of at least one compound selected from the group consisting of carboxy-containing reducing compounds and reducing saccharides having six or more carbon atoms used as a reducing agent is preferably about 0.1 to 100 g/L, and more preferably about 0.5 to 50 g/L.

If the amount of the reducing agent used is too small, a conductive coating is insufficiently formed, and deposition occurs unsatisfactorily over the range of low current density in the subsequent electroplating step. Therefore, the use of an excessively small amount of reducing agent is not preferable.

On the other hand, an excessively large amount of the reducing agent leads to economic disadvantage, and is not preferable in terms of the stability of the bath.

In the conductive-coating bath of the present invention, the "carboxy-containing reducing compound" and/or the "reducing saccharide having six or more carbon atoms" is used as a reducing agent. The "carboxy-containing reducing compound" and/or the "reducing saccharide having six or more carbon atoms" has relatively weak reducing power. In this manner, it is possible to use a hydantoin compound or organic carboxylic acid compound that have relatively weak complexing power as a complexing agent, without lowering the stability of the conductive-coating bath. The conductive-coating bath of the present invention containing the relatively weak reducing agent and a complexing agent stated above achieves excellent deposition and provides easy effluent treatment.

As the reducing agent contained in the conductive-coating bath of the present invention, the carboxy-containing reducing compound and the reducing saccharide having six or more carbon atoms are preferably used in combination. A combined use of these components improves the conductivity of the resulting coating in a great deal.

The conductive-coating bath of the present invention has excellent stability. Even when the bath is left unused for three days at ordinary temperature, almost no precipitates are formed, although a small amount of copper can possibly precipitate. In either case, the bath is stable for general use.

(2) Method of Forming a Conductive Coating

It is possible to form a conductive coating on a non-conductive plastic molding by bringing the conductive-coating bath of the present invention into contact with a non-conductive plastic molding to which a catalyst substance has been applied.

The following describes in detail the method of forming a conductive coating.

Non-Conductive Plastic Molding

Examples of non-conductive plastics include, but are not limited to, various plastic components recently widely used in the automobile industry and the like.

Examples of such large plastic materials include front grilles, emblems, and other automotive parts; exterior components of electronic devices, knobs, and other parts to be electroplated for decoration; materials to be plated for giving corrosion resistance or for adding a new function; and the like.

The quality of plastic materials is not limited, and various plastic materials known until now may be treated.

Examples of plastic materials are general-purpose plastics widely used until now for chemical plating such as ABS resins, general-purpose engineering plastics having a heat resistance at a temperature of 150° C. or less, such as polyamides (nylon PA), polyacetals (POM), polycarbonates (PC), modified polyphenylene ethers (PPE), polybutylene terephthalates (PBT) and the like, super engineering plastics having heat resistance at a temperature of 200° C. or more, such as polyphenylene sulfides (PPS), polyether sulfones (PES), polyether imides (PEI), polyether ether ketones (PEEK), polyimides (PI), liquid crystal polymers (LCP) and the like, polymer alloys such as polycarbonate/ABS, and the like.

Of these plastic materials, it is preferable to use plastic of a grade appropriate for plating, such as ABS resins, in which coating adhesion and coating appearance are not deteriorated when etching or other pretreatment is performed.

Pretreatment Process

In the method of forming a conductive coating of the present invention, a pretreatment is first conducted in the conventional manner. Specifically, the surface of a substrate to be treated is cleaned to remove extraneous matter such as fingerprints, fats and oils, and other organic substances, as well as dust clinging by static electricity. As a treatment solution, conventional degreasing agents may be used. Degreasing is conducted in a conventional manner using a conventional degreasing agent, such as an alkaline degreasing agent.

Next, the surface of the substrate to be treated is optionally etched.

This process selectively dissolves the surface of resin substrate to achieve an anchor effect, and the treatment above improves the adhesion property, appearance, etc., of the resulting conductive coating.

Etching may be carried out by using conventional methods. For example, the substrate to be treated may be immersed in a moderately heated mixed solution of chromic acid and sulfuric acid.

When an ABS resin is used as a substrate, the etching treatment allows the polybutadiene, i.e., a constituent component of ABS resin, to be oxidized by chromic acid and eluted to give anchor pores of about 1 to 2 μm in pore size to the surface of the resin, while the polybutadiene is caused to undergo oxidative decomposition, producing a polar group such as a carbonyl group. Consequently, a catalyst, such as a tin-palladium mixed colloidal solution, is easily adsorbed in the subsequent step.

When substrates such as general-purpose engineering plastic or super engineering plastic are used, it is often difficult to perform etching; therefore, it is preferable to perform pre-etching, if necessary, in a conventional manner before etching treatment.

The pre-etching treatment uses an organic solvent to swell a skin layer or a crystal-oriented layer on the surface of the resin substrate. The pre-etching can be performed generally using a solvent of high polarity such as dimethyl sulfoxide. This pre-etching treatment enhances the etching effect.

Also, resins containing inorganic materials, glass fibers, and the like can be treated by using a suitable etching method selected from conventional methods.

Thereafter, washing is performed to remove the etching solution such as chromic acid remaining on the resin surface.

In the washing, the use of a dilute hydrochloric acid solution or a solution containing a reducing agent such as sodium bisulfite makes it easy to remove the chromic acid remaining on the resin surface.

Catalyst Applying Step

Next, a catalyst is applied to the substrate obtained in the previous treatment step.

The type of catalyst is not particularly limited, and general-purpose known catalysts for electroless plating may be used.

For example, a known composition that is used for noble metal catalyst application and that contains, as a catalyst component, at least one component selected from the group consisting of silver, palladium, gold, ruthenium, copper, nickel, and platinum may be used.

The specific type of the composition for catalyst application and the process for catalyst application are not particularly limited, and may be suitably selected from known compositions and known processes for catalyst application.

For example, the following processes may be used for palladium catalyst application: a process comprising immersing a substrate in a sensitizer solution (a hydrochloric acid solution of tin(II) chloride), and then immersing the resulting substrate in an activator solution (a hydrochloric acid solution of palladium chloride) (a sensitizer-activator process); a process comprising immersing a substrate in a tin-palladium mixed colloidal solution to apply a catalyst to the substrate, and then immersing the resulting substrate in an accelerator solution comprising an acidic solution of sulfate or the like to dissolve excess tin ions so as to improve the catalytic activity (a catalyst-accelerator process); and the like.

When the conductive-coating bath of the present invention is used, it is preferable to use a tin-palladium mixed colloidal solution, which, in particular, easily causes deposition to uniformly form a coating on a resin molding.

As the tin-palladium mixed colloidal solution, it is possible to use a generally used acidic colloidal aqueous solution mixture containing palladium chloride and stannous chloride. For example, it is possible to use a colloidal solution mixture containing palladium chloride in an amount of about 0.05 to 0.6 g/L, stannous chloride in an amount of about 1 to 50 g/L, and 35% hydrochloric acid in an amount of about 100 to 400 mL/L.

As described above, a catalyst-accelerator process generally requires a substrate that has been subjected to catalyst application using a tin-palladium mixed colloidal solution to be immersed in an accelerator solution comprising an acidic solution of sulfate or the like to cause dissolution of excess tin ions to thereby improve the catalytic activity. However, in the method of forming a conductive coating of the present invention, it is possible to omit the treatment using an accelerator solution.

When the treatment using an accelerator solution is omitted, only washing with water of the substrate after catalyst application is required. Accordingly, in the method of forming a conductive coating of the present invention, the production process number can be reduced, which leads to cost reductions, and is thus industrially advantageous.

When the conductive-coating bath according to one embodiment of the present invention contains, as the reducing agent (E), both the carboxy-containing reducing compound and the reducing saccharide having six or more carbon atoms, it is possible to greatly reduce the amount of the addition of noble metal catalyst in the catalyst application step.

When the conductive-coating bath containing both the carboxy-containing reducing compound and the reducing saccharide having six or more carbon atoms is used, it is possible, for example, to reduce the amount of palladium chloride used to about 0.05 to 0.15 g/L.

The conditions for immersing a substrate in the tin-palladium mixed colloidal solution are not particularly limited. The substrate may generally be immersed in mixed colloidal solution that has a temperature adjusted to about 10 to 50° C., and preferably about 20 to 40° C.

The time for immersion is suitably adjusted according to, for example, the type of the conductive-coating bath of the present invention. It is generally about 2 to 10 min.

The conductive-coating bath of the present invention does not use a large amount of an expensive noble metal catalyst; thus, the production cost is reduced, which is industrially advantageous.

Conductive-Coating Formation Step

Next, a conductive coating is formed on a catalyst-applied non-conductive plastic molding by using the conductive-coating bath of the present invention.

As a method of forming a conductive coating by bringing the conductive-coating bath of the present invention into contact with a catalyst-applied non-conductive plastic molding, for example, a method comprising immersing a catalyst-applied non-conductive plastic molding in the conductive-coating bath may be used. This method can efficiently form a conductive coating.

The conductive-coating bath of the present invention has a pH of preferably about 10 to 14, and more preferably about 11.5 to 13.5. An excessively low pH prevents the reduction reaction from smoothly progressing and possibly induces, for example, decomposition of the reducing agent, which causes unsatisfactory deposition of the conductive coating and degradation of the conductive-coating bath. Therefore, an excessively low pH is not preferable. On the other hand, an excessively high pH tends to lower the stability of the conductive-coating bath, and is not preferable.

The temperature of the bath to form a conductive coating varies according to the specific composition, etc., of the conductive-coating bath. It is generally preferably about 30° C. or more, more preferably about 30 to 60° C., and particularly preferably about 45 to 55° C. If the liquid temperature of the conductive-coating bath is too low, the coating deposition reaction proceeds slowly, which easily results in a failure in deposition of a coating or creation of inferior appearance. On the other hand, if the conductive-coating bath has an excessively high liquid temperature, extensive evaporation of the conductive-coating bath takes place, which makes it difficult to maintain the composition of the plating liquid within the predetermined range, and decomposition of the conductive-coating bath is easily caused; thus, an excessively high liquid temperature is not preferable.

The time in which the conductive-coating bath is brought into contact is not particularly limited, and may be set as required for complete formation of conductive coating. The time is suitably set according to the surface state of the conductive coating. If the contact time is too short, the supply of a conductive coating onto the subject surface will be insufficient, making it impossible to fully form a conductive coating.

As described above, one embodiment of the method of forming a conductive coating by bringing the conductive-coating bath of the present invention into contact with a catalyst-applied non-conductive plastic molding comprises, for example, immersing a catalyst-applied non-conductive plastic molding. When immersion is performed, the time for immersion is preferably about 1 to 10 minutes, and more preferably about 3 to 5 minutes.

When a conductive coating is formed by using the above method, it is preferable to bring the conductive-coating bath in a state in which the bath contains an increased amount of dissolved oxygen into contact with a non-conductive plastic molding.

The use of this method can form a thicker conductive coating thereby improve the conductivity of the conductive coating.

A means for achieving the state in which the bath contains an increased amount of dissolved oxygen is not particularly limited, and any method may be used, such as a method of supplying oxygen-containing gas bubbles to the conductive-coating bath or a method of adding an oxidizing agent.

The state in which the bath contains an increased amount of dissolved oxygen refers not only to the state after the amount of dissolved oxygen has been increased by supplying oxygen-containing gas bubbles to the conductive-coating bath or adding an oxidizing agent, but also the state in which the amount of dissolved oxygen is being increased by continuously supplying oxygen-containing gas bubbles to the conductive-coating bath or by continuously adding an oxidizing agent.

Oxygen or air may be used as the oxygen-containing gas. Oxygen or air may include gases such as nitrogen and noble gas in addition to oxygen.

The oxidizing agent is not particularly limited, and a known compound that can increase the amount of dissolved oxygen may be used. For example, the addition of sodium persulfate, hydrogen peroxide solution, or the like increases the amount of dissolved oxygen in the conductive-coating bath.

The amount of the oxidizing agent added is preferably about 0.1 to 5 g/L, with respect to the conductive-coating bath.

Conductive Coating

A conductive coating may be formed on a catalyst-applied non-conductive plastic molding by using the conductive-coating bath of the present invention. The formed conductive coating mainly contains copper oxide.

When the coating of copper oxide is immersed in an acidic aqueous solution, the copper oxide presumably undergoes a disproportionation reaction, thereby forming a dense coating containing metal copper.

As the acidic aqueous solution, in particular, a sulfate-containing aqueous solution is preferable.

After the formation of the coating of copper oxide, the molding is immersed in a sulfate-containing acidic aqueous solution to form a dense coating containing metal copper; however, when the subsequent step uses a sulfate-containing acidic plating solution such as a copper sulfate plating solution, the immersion step in an acidic aqueous solution may be omitted.

This dense coating containing metal copper has improved conductivity and improved acid resistance. This conductive coating is not damaged in the electroplating step, making it possible to form a coating having a uniform appearance by electroplating.

Electroplating Step

Next, the substrate thus treated by using the conductive-coating bath of the present invention is subjected to electroplating in accordance with known methods.

The types of the electroplating bath are not limited, and any electroplating bath known until now may be used. The plating conditions may also be set in accordance with known methods.

As one example of electroplating, the following describes in detail an electroplating method for a decorating purpose, successively comprising copper plating, nickel plating, and chromium plating.

A known copper sulfate plating bath, for example, may be used for copper plating.

For example, a plating bath usable in the present invention is obtained by adding a known brightener to an aqueous solution containing about 100 to 250 g/L of copper sulfate, about 20 to 120 g/L of sulfate, and about 20 to 70 ppm of chlorine ions. The copper sulfate plating conditions may be set as generally done. For example, plating may be performed at a liquid temperature of room temperature and a current density of about 3 A/dm² until the predetermined film thickness is obtained.

The conductive coating obtained by using the conductive-coating bath of the present invention has a high acid resistance; therefore, even when the coating is immersed in the electroplating step in a strongly acidic plating solution, such as a copper sulfate plating solution, the coating is not damaged, and a decorative coating having uniform and excellent appearance is formed.

For nickel plating, a known nickel plating bath such as a usual Watts bath may be used. Specifically, a usable plating bath may be prepared by adding a commercially available brightener for nickel plating baths to an aqueous solution containing about 200 to 350 g/L of nickel sulfate, about 30 to 80 g/L of nickel chloride, and about 20 to 60 g/L of boric acid. The plating conditions may be set as generally done. For example, electroplating may be performed at a liquid temperature of about 55 to 60° C. and at a current density of about 3 A/dm² until a coating of the predetermined film thickness is obtained.

For chromium plating, a known chromium plating bath such as a usual Sargent bath may be used. Specifically, an aqueous solution containing about 200 to 300 g/L of chromic anhydride and about 2 to 5 g/L of sulfate may be used. The plating may be performed under the conditions at a liquid temperature of about 45° C. and at a current density of about 20 A/dm² until a coating of the predetermined film thickness is obtained.

Advantageous Effects of Invention

The conductive-coating bath of the present invention makes it possible to form a bridge-free uniform conductive coating on a non-conductive plastic molding. The formed conductive coating has excellent conductivity, as well as excellent acid resistance. Thus, when electroplating is performed on this coating, it is possible to form a decorative coating having excellent appearance.

DESCRIPTION OF EMBODIMENTS

Figure 1:
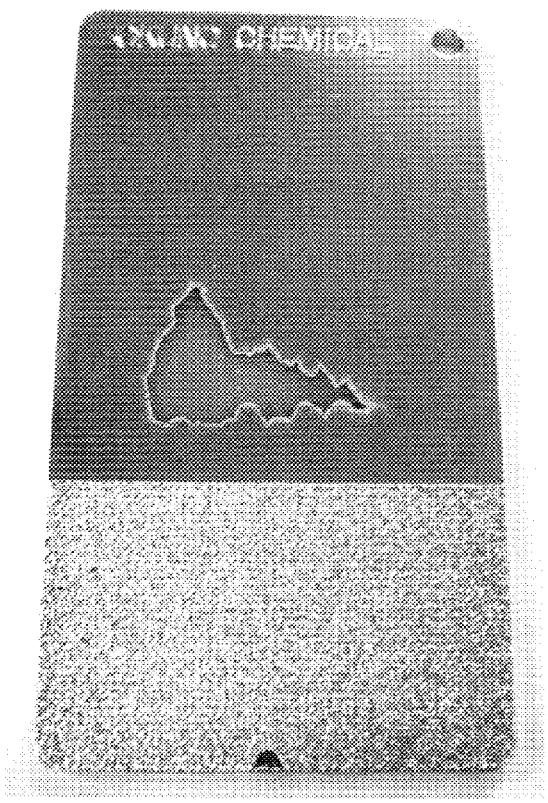
FIG. 1 is a photograph showing the appearance of a substrate obtained by forming a conductive coating by using comparative bath 2, followed by copper sulfate electroplating.

The present invention is described in detail with reference to Examples. However, the present invention is not limited to these Examples.

EXAMPLES

Example 1

A flat plate made of an ABS resin (UMG ABS3001M, produced by UNG ABS, Ltd.) measuring 10 cm×5 cm×0.3 cm (thickness) and having a surface area of about 1 dm² was used as a substrate to be treated. A jig for use in plating operation had two contact points for contact with the substrate to be treated, the two contact points being spaced away by 11 cm. The jig was constructed from a stainless steel rod and had a contact point portion with a diameter of 2 mm. The portion other than the contact points in the jig was coated with a vinyl chloride sol by baking.

Degreasing Treatment

First, the substrate to be treated was set in the jig, which was immersed in a solution of an alkaline degreasing agent (Ace Clean A-220, 50 g/L aqueous solution, produced by Okuno Chemical Industries Co., Ltd.) at 50° C. for 5 minutes and washed with water.

Etching Treatment

The resulting substrate was immersed in an etching solution comprising an aqueous solution containing 400 g/L chromic anhydride and 400 g/L of sulfuric acid at 67° C. for 8 minutes to give a rough surface to the resin substrate.

Neutralizing Treatment

Thereafter, the resulting substrate was washed with water, immersed in an aqueous solution containing 50 mL/L of 35% hydrochloric acid at room temperature for 30 seconds to remove the chromic acid from the resin surface, and washed well with water.

Pre-Dipping Treatment

Then, pre-dipping was performed by dipping the substrate into an aqueous solution containing 250 mL/L of 35% hydrochloric acid at 25° C. for 1 minute.

Catalyzing Treatment

The substrate was then immersed in a colloidal solution (pH: 1 or less) containing 83.3 mg/L of palladium chloride (50 mg/L as Pd), 8.6 g/L of stannous chloride (4.5 g/L as Sn), and 250 mL/L of 35% hydrochloric acid at 35° C. for 6 minutes to cause a catalyst to uniformly adhere to the resin substrate.

Conductive-Coating Formation Treatment

Thereafter, the substrate was washed with water and immersed in the conductive-coating bath (bath 1 of the invention) of Example 1 shown in Table 1 below at a bath temperature of 45° C. for 5 minutes to form a conductive coating.

The conductive-coating baths in the Examples may sometimes be referred to as a "bath of the invention." The conductive-coating baths in the Comparative Examples may sometimes be referred to as "comparative baths."

TABLE 1

| | No. | (A) Copper compound | (B) Complexing agent | (C) Alkali metal hydroxide | (D) $C_{2-5}$ aliphatic polyalcohol | (E) Carboxy-containing reducing compound | (E) Reducing saccharides having six or more carbon atoms |
|---|---|---|---|---|---|---|---|
| Examples | 1 | Copper sulfate-pentahydrate (4 g/L) | Rochelle salt (20 g/L) | Sodium hydroxide (65 g/L) | ethylene glycol (50 g/L) | formic acid (10 g/L) | |
| | 2 | | | | 1,2-propanediol (50 g/L) | formic acid (10 g/L) | |
| | 3 | | | | glycerin (50 g/L) | formic acid (10 g/L) | |
| | 4 | | | | erythritol (50 g/L) | formic acid (10 g/L) | |
| | 5 | | | | xylitol (50 g/L) | formic acid (10 g/L) | |
| | 6 | | | | glycerin (50 g/L) | oxalic acid (10 g/L) | |
| | 7 | | | | glycerin (50 g/L) | maleic acid (10 g/L) | |
| | 8 | | | | glycerin (50 g/L) | glyoxylic acid (0.5 g/L) | |
| | 9 | | | | glycerin (50 g/L) | formic acid (50 g/L) | |
| | 10 | | | | glycerin (200 g/L) | formic acid (10 g/L) | |
| | 11 | | | | glycerin (200 g/L) | formic acid (50 g/L) | |
| | 12 | Copper sulfate-pentahydrate (4 g/L) | Rochelle salt (20 g/L) | Sodium hydroxide (65 g/L) | ethylene glycol (50 g/L) | | glucono lactone (0.5 g/L) |
| | 13 | | | | 1,2-propanediol (50 g/L) | | glucono lactone (0.5 g/L) |
| | 14 | | | | glycerin (50 g/L) | | glucono lactone (0.5 g/L) |
| | 15 | | | | erythritol (50 g/L) | | glucono lactone (0.5 g/L) |
| | 16 | | | | xylitol (50 g/L) | | glucono lactone (0.5 g/L) |
| | 17 | | | | glycerin (50 g/L) | | glucose (0.5 g/L) |
| | 18 | | | | glycerin (50 g/L) | | sorbit (0.5 g/L) |
| | 19 | | | | glycerin (50 g/L) | | cellulose (0.5 g/L) |
| | 20 | | | | glycerin (50 g/L) | | cane sugar (0.5 g/L) |
| | 21 | | | | glycerin (50 g/L) | | mannitol (0.5 g/L) |
| | 22 | | | | glycerin (50 g/L) | | ascorbic acid (0.5 g/L) |
| | 23 | | | | glycerin (50 g/L) | | glucono lactone (5.0 g/L) |
| | 24 | | | | glycerin (200 g/L) | | glucono lactone (0.5 g/L) |
| | 25 | | | | glycerin (200 g/L) | | glucono lactone (5.0 g/L) |
| | 26 | Copper sulfate-pentahydrate (4 g/L) | Rochelle salt (20 g/L) | Sodium hydroxide (65 g/L) | ethylene glycol (50 g/L) | formic acid (10 g/L) | glucose (0.5 g/L) |
| | 27 | | | | ethylene glycol (50 g/L) | formic acid (10 g/L) | sorbit (0.5 g/L) |
| | 28 | | | | ethylene glycol (50 g/L) | formic acid (10 g/L) | cellulose (0.5 g/L) |
| | 29 | | | | ethylene glycol (50 g/L) | formic acid (10 g/L) | cane sugar (0.5 g/L) |
| | 30 | | | | ethylene glycol (50 g/L) | formic acid (10 g/L) | mannitol (0.5 g/L) |
| | 31 | | | | ethylene glycol (50 g/L) | formic acid (10 g/L) | glucono lactone (0.5 g/L) |
| | 32 | | | | ethylene glycol (50 g/L) | formic acid (10 g/L) | ascorbic acid (0.5 g/L) |

TABLE 2

| | No. | (A) Copper compound | (B) Complexing agent | (C) Alkali metal hydroxide | (D) $C_{2-5}$ aliphatic polyalcohol | (E) Carboxy-containing reducing compound | (E) Reducing saccharides having six or more carbon atoms |
|---|---|---|---|---|---|---|---|
| Comparative Examples | 1 | Copper sulfate-pentahydrate (4 g/L) | Rochelle salt (20 g/L) | Sodium hydroxide (65 g/L) | | formic acid (10 g/L) | |
| | 2 | | | | | oxalic acid (10 g/L) | |
| | 3 | | | | | maleic acid (10 g/L) | |
| | 4 | | | | | glyoxylic acid (0.5 g/L) | |
| | 5 | | | | | | |
| | 6 | Copper sulfate-pentahydrate (4 g/L) | Rochelle salt (20 g/L) | Sodium hydroxide (65 g/L) | | | glucose (0.5 g/L) |
| | 7 | | | | | | sorbit (0.5 g/L) |
| | 8 | | | | | | cellulose (0.5 g/L) |
| | 9 | | | | | | cane sugar (0.5 g/L) |
| | 10 | | | | | | mannitol (0.5 g/L) |
| | 11 | | | | | | glucono lactone (0.5 g/L) |
| | 12 | | | | | | ascorbic acid (0.5 g/L) |
| | 13 | Copper sulfate-pentahydrate (4 g/L) | Rochelle salt (20 g/L) | Sodium hydroxide (65 g/L) | methanol (50 g/L) | | |
| | 14 | | | | ethanol (50 g/L) | | |
| | 15 | | | | ethylene glycol (50 g/L) | | |
| | 16 | | | | 1,2-propanediol (50 g/L) | | |
| | 17 | | | | glycerin (50 g/L) | | |
| | 18 | | | | erythritol (50 g/L) | | |
| | 19 | | | | xylitol (50 g/L) | | |
| | 20 | | | | diethylene glycol (50 g/L) | | |
| | 21 | | | | triethylene glycol (50 g/L) | | |
| | 22 | | | | 1,3-propanediol (50 g/L) | | |

TABLE 2-continued

| | | | | | Composition | |
|---|---|---|---|---|---|---|
| | | | | | | (E) |
| No. | (A) Copper compound | (B) Complexing agent | (C) Alkali metal hydroxide | (D) $C_{2-5}$ aliphatic polyalcohol | Carboxy-containing reducing compound | Reducing saccharides having six or more carbon atoms |
| 23 | Copper sulfate-pentahydrate (4 g/L) | Rochelle salt (20 g/L) | Sodium hydroxide (65 g/L) | methanol (50 g/L) | formic acid (10 g/L) | |
| 24 | | | | methanol (200 g/L) | formic acid (10 g/L) | |
| 25 | | | | ethanol (50 g/L) | formic acid (10 g/L) | |
| 26 | | | | ethanol (200 g/L) | formic acid (10 g/L) | |

Copper Sulfate Plating Treatment

Then, the substrate was washed well with water and subjected to the subsequent copper electroplating step while held in the jig. A copper electroplating bath was prepared by adding as a brightener 5 mL/L of Top Lucina 2000MU and 0.5 mL/L of Top Lucina 2000A (produced by Okuno Chemical Industries Co., Ltd.) to an aqueous solution containing 250 g/L of copper sulfate-$5H_2O$, 50 g/L of sulfuric acid, and 50 mg/L of chlorine ions. Using this bath, a copper electroplating operation was performed at a liquid temperature of 25° C. and a current density of 3 A/dm² for 5 minutes using a phosphorus-containing copper plate as an anode and the substrate to be plated as a cathode while applying mild air agitation.

Examples 2 to 32 and Comparative Examples 1 to 26

The same substrate and jig as used in Example 1 were used and the same procedures as in Example 1 were performed to the catalyst application.

Thereafter, a conductive coating was formed under the same conditions as in Example 1 by using each conductive-coating bath (baths 2 to 32 of the invention and comparative baths 1 to 26) as shown in Tables 1 and 2 below. Then, each of the resulting substrates was washed with water, and copper electroplating was performed under the same conditions as in Example 1.

The coverage and appearance of each copper-plated coating formed using the above method were evaluated as described below. The surface resistance of each conductive coating after the conductive-coating formation treatment, as well as the surface resistance of each conductive coating after immersion in the copper sulfate plating bath for 5 minutes without applying current, was also measured.

Plating Coverage

Evaluation method: After copper electroplating, the percentage of the copper-plated area on the surface of a test piece was determined.

Appearance after Copper Electroplating

Evaluation method: After copper electroplating, the occurrence of pits and stardust, and the degree of gloss were evaluated by visual inspection.

Surface Resistance

Evaluation method: The surface resistance was measured after the conductive-coating formation treatment and after immersion in the copper sulfate plating bath for 5 minutes without applying current.

For the surface resistance, the value at a 1-cm width of the surface was measured using a simple tester.

Tables 3 and 4 show the results.

TABLE 3

| | No. | Electroplating coverage (%) | Plating appearance | Surface resistance after the conductive-coating film formation treatment (kΩ) | Surface resistance 5 minutes after immersion in copper sulfate (kΩ) |
|---|---|---|---|---|---|
| Examples | 1 | 100 | gloss | 70-900 | 65-450 |
| | 2 | 100 | gloss | 70-1,000 | 65-450 |
| | 3 | 100 | gloss | 70-800 | 70-400 |
| | 4 | 100 | gloss | 70-1,000 | 65-550 |
| | 5 | 100 | gloss | 70-900 | 60-500 |
| | 6 | 100 | gloss | 70-800 | 65-400 |
| | 7 | 100 | gloss | 70-800 | 70-400 |
| | 8 | 100 | gloss | 20-900 | 15-450 |
| | 9 | 100 | gloss | 70-800 | 65-400 |
| | 10 | 100 | gloss | 70-800 | 60-450 |
| | 11 | 100 | gloss | 70-800 | 60-450 |
| | 12 | 100 | gloss | 70-800 | 60-400 |
| | 13 | 100 | gloss | 70-800 | 60-450 |
| | 14 | 100 | gloss | 70-850 | 65-400 |
| | 15 | 100 | gloss | 70-900 | 65-450 |
| | 16 | 100 | gloss | 70-800 | 60-450 |
| | 17 | 100 | gloss | 70-800 | 65-400 |
| | 18 | 100 | gloss | 70-800 | 65-400 |
| | 19 | 100 | gloss | 70-850 | 65-400 |
| | 20 | 100 | gloss | 70-800 | 65-400 |
| | 21 | 100 | gloss | 70-800 | 70-400 |
| | 22 | 100 | gloss | 20-800 | 18-400 |
| | 23 | 100 | gloss | 70-850 | 70-450 |
| | 24 | 100 | gloss | 70-800 | 70-400 |
| | 25 | 100 | gloss | 70-800 | 70-400 |
| | 26 | 100 | gloss | 40-300 | 25-120 |
| | 27 | 100 | gloss | 40-300 | 30-150 |
| | 28 | 100 | gloss | 40-250 | 20-110 |
| | 29 | 100 | gloss | 40-310 | 25-150 |
| | 30 | 100 | gloss | 40-300 | 30-180 |
| | 31 | 100 | gloss | 40-280 | 28-150 |
| | 32 | 100 | gloss | 10-280 | 9-110 |

TABLE 4

| | No. | Electroplating coverage (%) | Plating appearance | Surface resistance after the conductive-coating film formation treatment (kΩ) | Surface resistance 5 minutes after immersion in copper sulfate (kΩ) |
|---|---|---|---|---|---|
| Comparative Examples | 1 | 80 | wavy and wrinkled | 75-1,500 | 100-10,000 or more |
| | 2 | 80 | wavy and wrinkled | 75-1,500 | 100-10,000 or more |
| | 3 | 80 | wavy and wrinkled | 75-1,500 | 100-10,000 or more |
| | 4 | 80 | wavy and wrinkled | 75-1,500 | 100-10,000 or more |
| | 5 | 80 | wavy and wrinkled | 20-1,500 | 100-10,000 or more |
| | 6 | 80 | wavy and wrinkled | 70-1,500 | 100-10,000 or more |
| | 7 | 80 | wavy and wrinkled | 70-1,500 | 100-10,000 or more |
| | 8 | 80 | wavy and wrinkled | 70-1,500 | 100-10,000 or more |
| | 9 | 80 | wavy and wrinkled | 70-1,500 | 100-10,000 or more |
| | 10 | 80 | wavy and wrinkled | 70-1,500 | 100-10,000 or more |
| | 11 | 80 | wavy and wrinkled | 70-1,500 | 100-10,000 or more |
| | 12 | 80 | wavy and wrinkled | 18-1,500 | 100-10,000 or more |
| | 13 | 80 | wavy and wrinkled | 75-1,500 | 100-10,000 or more |
| | 14 | 80 | wavy and wrinkled | 75-1,500 | 100-10,000 or more |
| | 15 | 80 | wavy and wrinkled | 70-1,500 | 100-10,000 or more |
| | 16 | 80 | wavy and wrinkled | 75-1,500 | 100-10,000 or more |
| | 17 | 80 | wavy and wrinkled | 75-1,500 | 100-10,000 or more |
| | 18 | 80 | wavy and wrinkled | 75-1,500 | 100-10,000 or more |
| | 19 | 80 | wavy and wrinkled | 75-1,500 | 100-10,000 or more |
| | 20 | 80 | wavy and wrinkled | 75-1,500 | 100-10,000 or more |
| | 21 | 80 | wavy and wrinkled | 75-1,500 | 100-10,000 or more |
| | 22 | 80 | wavy and wrinkled | 75-1,500 | 100-10,000 or more |
| | 23 | 80 | wavy and wrinkled | 75-1,500 | 100-10,000 or more |
| | 24 | 80 | wavy and wrinkled | 75-1,500 | 100-10,000 or more |
| | 25 | 80 | wavy and wrinkled | 75-1,500 | 100-10,000 or more |
| | 26 | 80 | wavy and wrinkled | 75-1,500 | 100-10,000 or more |

Test Example 1: Plating Coverage

Baths 1 to 32 of the invention all achieved a coverage of 100%.

In contrast, comparative baths 1 to 26 all achieved a coverage of about 80%; i.e., complete coatings were not formed.

Test Example 2: Appearance after Copper Electroplating

Figure 2:
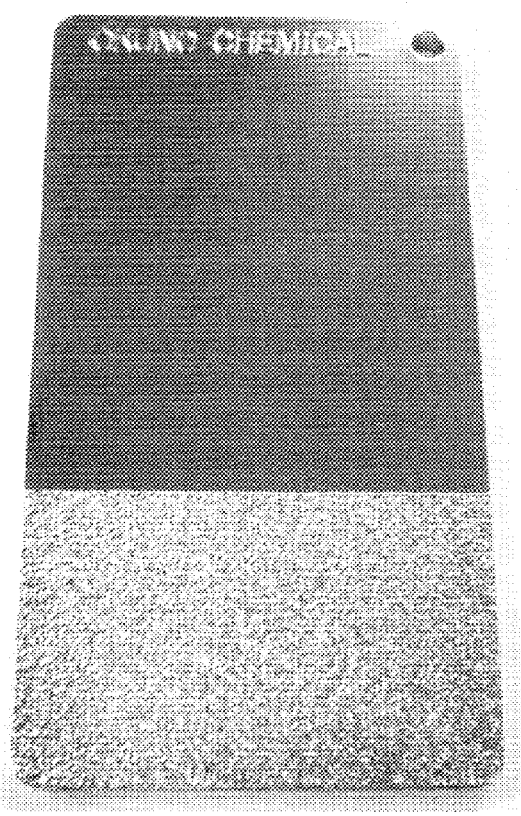
FIG. 2 is a photograph showing the appearance of a substrate obtained by forming a conductive coating by using bath 2 of the invention, followed by copper sulfate electroplating.

As shown in FIG. 2, when baths 1 to 32 of the invention were used, coatings with very excellent gloss appearance were formed, and no flaw was found on the surface of each coating.

In contrast, as shown in FIG. 1, when comparative baths 1 to 26 were used, complete coatings were not formed with pits and stardust being developed, resulting in the formation of coatings with a wavy and wrinkled appearance.

In particular, when comparative baths 23 to 26, which contained an alcohol having one hydroxyl group, such as methanol or ethanol, were used, deterioration of the coating appearance was observed. This indicates that aliphatic polyalcohol compounds having two or more hydroxyl groups are effective.

Test Example 3: Surface Resistance

When baths 1 to 32 of the invention were used, the surface resistance of each conductive coating after the conductive-coating formation treatment was low.

In contrast, when comparative baths 1 to 26 were used, the surface resistance of each conductive coating after the conductive-coating formation treatment was higher than that of each coating obtained with the use of baths 1 to 32 of the invention.

Further, when baths 1 to 32 of the invention were used, the surface resistance of each conductive coating after immersion in a strongly acidic copper sulfate plating bath for 5 minutes was lower than the surface resistance of each conductive coating after the conductive-coating formation treatment, indicating that the conductivity was excellent.

In contrast, when comparative baths 1 to 26 were used, the surface resistance of each conductive coating after immersion in a strongly acidic copper sulfate plating bath for 5 minutes was higher than the surface resistance of each conductive coating after the conductive-coating formation treatment, indicating that the conductivity was deteriorated.

In view of these results, the conductive-coating bath of the present invention is capable of forming a coating with excellent conductivity on a catalyst-applied non-conductive plastic molding, and when each coating is subsequently immersed in a strongly acidic copper sulfate plating solution, the copper oxide of each conductive coating presumably undergoes a disproportionation reaction, thereby forming a dense coating containing metal copper with improved conductivity.

Further, when baths 26 to 32 of the invention containing as the reducing agent (E) both a carboxy-containing reducing compound and a reducing saccharide having six or more carbon atoms were used (Examples 26 to 32), a considerable reduction was seen, in particular, in both the surface resistance of each conductive coating after the formation treatment and the surface resistance of each conductive coating after immersion in a strongly acidic copper sulfate plating bath for 5 minutes, indicating that these coatings had excellent conductivity.

In this manner, baths 1 to 32 of the invention achieved excellent properties in terms of plating coverage, appearance, and surface resistance, compared to comparative baths 1 to 26.

Test Example 4: Relationship Between the Amount of $C_{2-5}$ Aliphatic Polyalcohol and the Surface Resistance of Conductive Coating Table 5 shows the surface resistance of each conductive coating obtained using baths 1 and 33 to 38 of the invention.

As the $C_{2-5}$ aliphatic polyalcohol contained in the conductive-coating bath of the present invention, baths 33 to 38 of the invention contained diethylene glycol or 1,3-propanediol that have three or more carbon atoms between two hydroxyl groups while bath 1 of the invention contained ethylene glycol having two carbon atoms between two hydroxyl groups.

a reducing saccharide having six or more carbon atoms (Example 31), achieved a complete coating even when the palladium concentration was further reduced to 35 mg/L (Example No. 31).

These results confirm that even when the catalyst amount is reduced, the use of the conductive-coating bath containing as the reducing agent both a carboxy-containing reducing

TABLE 5

|  | Bath 1 of the invention | Bath 33 of the invention | Bath 34 of the invention | Bath 35 of the invention | Bath 36 of the invention | Bath 37 of the invention | Bath 38 of the invention |
| --- | --- | --- | --- | --- | --- | --- | --- |
| Copper sulfate-pentahydrate | 4 | 4 | 4 | 4 | 4 | 4 | 4 |
| Rochelle salt | 20 | 20 | 20 | 20 | 20 | 20 | 20 |
| Sodium hydroxide | 65 | 65 | 65 | 65 | 65 | 65 | 65 |
| Formic acid | 10 | 10 | 10 | 10 | 10 | 10 | 10 |
| Ethylene glycol | 50 |  |  |  |  |  |  |
| Diethylene glycol |  | 50 | 100 | 200 |  |  |  |
| 1,3-propanediol |  |  |  |  | 50 | 100 | 100 |
| Surface resistance after conductive-coating formation | 70-900 | 75-1,500 | 75-1,500 | 75-1,000 | 75-1,500 | 75-1,000 | 75-1,000 |
| Surface resistance 5 minutes after immersion in copper sulfate ($\Omega$) | 65-450 | 10-10,000 or more | 70-2,000 | 65-700 | 100-10,000 or more | 70-2,000 | 70-700 |

Amount: g/L

Bath 1 of the invention containing ethylene glycol having two carbon atoms between two hydroxyl groups achieved excellent conductivity, regardless of the small aliphatic polyalcohol content.

Even when the conductive-coating bath contained aliphatic polyalcohol having three or more carbon atoms between hydroxyl groups, if the aliphatic polyalcohol content was increased from 50 g/L to 100 g/L or 200 g/L, the surface resistance of the coating obtained 5 minutes after immersion in a copper sulfate plating bath was lowered, indicating that an improvement in the conductivity was possible.

Test Example 5

Table 6 shows the relationship between the palladium concentration in the catalyzing treatment and the coverage on the substrate in terms of the conductive coating formed by using each conductive-coating bath of the present invention, followed by the copper electroplating treatment.

TABLE 6

|  | Palladium concentration (mg/L) | | | |
| --- | --- | --- | --- | --- |
|  | 30 | 50 | 70 | 100 |
| Bath 1 of the invention | 80 | 100 | 100 | 100 |
| Bath 12 of the invention | 80 | 100 | 100 | 100 |
| Bath 31 of the invention | 100 | 100 | 100 | 100 |
| Comparative bath 2 | 50 | 80 | 100 | 100 |
| Comparative bath 11 | 50 | 80 | 100 | 100 |
| Comparative bath 15 | 50 | 80 | 100 | 100 |

Coverage (%) of copper sulfate plating

Bath 1 of the invention, which contained a carboxy-containing reducing compound as the reducing agent (E) (Example 1), and bath 12 of the invention, which contained a reducing saccharide having six or more carbon atoms as the reducing agent (E) (Example 12), achieved a complete coating when the palladium concentration was 50 mg/L.

Bath 31 of the invention, which contained as the reducing agent (E) both a carboxy-containing reducing compound and compound and a reducing saccharide having six or more carbon atoms allows to perform electroplating that achieves excellent appearance.

In contrast, comparative baths each containing either a aliphatic polyalcohol compound, a carboxy-containing reducing compound, or a reducing saccharide having six or more carbon atoms required the palladium concentration of 70 mg/L or more to achieve a complete coating of copper sulfate.

Test Example 6: Relationship Between the Amount of Dissolved Oxygen and the Copper Oxide Coating Formation The relationship between the dissolved oxygen amount in the bath and the formation of copper oxide coating was evaluated using each of the following test baths.
Comparative Bath 11
(A) Copper sulfate-pentahydrate: 4 g/L
(B) Rochelle salt: 20 g/L
(C) Sodium hydroxide: 65 g/L
(E) Gluconolactone: 0.5 g/L
Comparative Bath 15
(A) Copper sulfate-pentahydrate: 4 g/L
(B) Rochelle salt: 20 g/L
(C) Sodium hydroxide: 65 g/L
(D) Ethylene glycol: 50 g/L
Bath 12 of the Invention
(A) Copper sulfate-pentahydrate: 4 g/L
(B) Rochelle salt: 20 g/L
(C) Sodium hydroxide: 65 g/L
(D) Ethylene glycol: 50 g/L
(E) Gluconolactone: 0.5 g/L
Evaluation Method After the formation of a conductive coating, the substrate was immersed in an acidic copper sulfate plating solution for 5 minutes without applying current, and the copper content in the coating and the surface resistance were measured.

To measure the copper content in the coating, the conductive coating was dissolved in aqua regia, and the copper content in the coating was calculated based on the copper concentration in the aqua regia.

For the surface resistance, the value at a 1-cm width of the surface was measured using a simple tester.

TABLE 7

|  | Comparative bath 11 | | Comparative bath 15 | | Bath 12 of the invention | |
| --- | --- | --- | --- | --- | --- | --- |
|  | Copper content (mg/dm$^2$) | Surface resistance (kΩ) | Copper content (mg/dm$^2$) | Surface resistance (kΩ) | Copper content (mg/dm$^2$) | Surface resistance (kΩ) |
| No bubbling (dissolved oxygen: 1.5 mg/L) | 0.06 | 100-10,000 or more | 0.06 | 100-10,000 or more | 0.07 | 60-400 |
| Air bubbling conditions (dissolved oxygen: 4.0 mg/L) | 0.08 | 100-7,000 | 0.08 | 100-5,000 | 0.3 | 30-110 |

When the amount of dissolved oxygen in the conductive-coating bath was increased to 4.0 mg/L by supplying air bubbles, the copper content in the coating was considerably increased (bath 12 of the invention). As a result, the surface resistance of the coating after being subjected to the copper sulfate plating treatment was considerably reduced, showing excellent conductivity.

Compared to bath 12 of the invention, although comparative baths 11 and 15 showed a reduction in the surface resistance of the coating after being subjected to copper sulfate plating treatment, only a slight increase was confirmed in the copper content.

TABLE 8

|  | Comparative bath 11 | | Comparative bath 15 | | Bath 12 of the invention | |
| --- | --- | --- | --- | --- | --- | --- |
|  | Copper content (mg/dm$^2$) | Surface resistance (kΩ) | Copper content (mg/dm$^2$) | Surface resistance (kΩ) | Copper content (mg/dm$^2$) | Surface resistance (kΩ) |
| No bubbling | 0.06 | 100-10,000 or more | 0.06 | 100-10,000 or more | 0.07 | 60-400 |
| Sodium persulfate (2 g/L) | 0.24 | 15-180 | 0.25 | 15-170 | 0.38 | 15-50 |
| 30% hydrogen peroxide solution (5 mL/L) | 0.22 | 25-180 | 0.21 | 25-120 | 0.31 | 25-70 |

When the amount of dissolved oxygen was increased by adding an oxidizing agent (sodium persulfate or 30% hydrogen peroxide solution) to the conductive-coating bath of the present invention instead of by supplying air bubbles, it was also clearly shown that bath 12 of the invention achieved an increase in the copper content in the coating, thus achieving significant increase in the conductivity, unlike comparative baths 11 and 15.

The invention claimed is:

1. A conductive-coating bath comprising an aqueous solution containing:
   (A) a copper compound;
   (B) a complexing agent;
   (C) an alkali metal hydroxide;
   (D) a C$_{2-5}$ aliphatic polyalcohol compound; and
   (E) at least one compound selected from the group consisting of reducing compounds having a —COOM group, wherein M is hydrogen, an alkali metal, or a —NH$_4$ group, and reducing saccharides having six or more carbon atoms,
   wherein the conductive-coating bath has a pH of 10.0 to 14.0.

2. The conductive-coating bath according to claim 1, wherein the bath comprises as component (E) both a reducing compound having a —COOM group, wherein M is hydrogen, an alkali metal, or a —NH$_4$ group, and a reducing saccharide having six or more carbon atoms.

3. A method of forming a conductive coating on a non-conductive plastic molding, the method comprising bringing the conductive-coating bath of claim 1 into contact with a non-conductive plastic molding to which a catalyst substance is applied.

4. The method of forming a conductive coating according to claim 3, wherein the conductive-coating bath is in a state in which the amount of dissolved oxygen is increased when brought into contact with the non-conductive plastic molding.

5. The method of forming a conductive coating according to claim 4, wherein the amount of the dissolved oxygen is increased by supplying oxygen-containing gas bubbles or by adding an oxidizing agent to the bath.

6. A method of electroplating a non-conductive plastic molding, the method comprising the steps of:
   forming a conductive coating according to the method of claim 3; and
   performing electroplating.

7. A method of forming a conductive coating on a non-conductive plastic molding, the method comprising bringing the conductive-coating bath of claim 2 into contact with a non-conductive plastic molding to which a catalyst substance is applied.

8. A method of electroplating a non-conductive plastic molding, the method comprising the steps of:
   forming a conductive coating according to the method of claim 4; and
   performing electroplating.

9. A method of electroplating a non-conductive plastic molding, the method comprising the steps of:
   forming a conductive coating according to the method of claim 5; and
   performing electroplating.

10. A method of electroplating a non-conductive plastic molding, the method comprising the steps of:
   forming a conductive coating according to the method of claim 7; and
   performing electroplating.

* * * * *